United States Patent [19]

Crooks

[11] 4,352,175
[45] Sep. 28, 1982

[54] VIDEO DISC PLAYER HAVING RECORD SIDE IDENTIFYING APPARATUS

[75] Inventor: Horatio N. Crooks, Indianapolis, Ind.

[73] Assignee: RCA Corporation, New York, N.Y.

[21] Appl. No.: 276,691

[22] Filed: Jun. 19, 1981

[51] Int. Cl.³ .............................................. G11B 17/04
[52] U.S. Cl. ..................................... 369/77; 206/309; 206/444; 360/133
[58] Field of Search ........ 369/77; 200/61.59, 61.58 R, 200/16 R, 153 LA, 242, 198; 242/198; 206/309, 312, 444; 360/86, 97, 98, 99, 133

[56] References Cited

U.S. PATENT DOCUMENTS

| 4,191,867 | 3/1980 | Feaster ............................... 200/16 R |
| 4,205,853 | 6/1980 | Turrington ............................ 369/77 |
| 4,206,926 | 6/1980 | Stave ................................... 369/77 |
| 4,247,119 | 1/1981 | Hughes ................................ 369/77 |

Primary Examiner—Steven L. Stephan
Attorney, Agent, or Firm—E. M. Whitacre; J. S. Tripoli; D. A. Kulkarni

[57] ABSTRACT

The record side identification device for a video disc player includes a pair of switches. The order of closure of the switches depends upon which side of the record carrying caddy is uppermost in the player. A circuit means, responsive to the sequence of operation of the switches, lights appropriate one of the lamps to provide an indication of the record side subject to play.

15 Claims, 10 Drawing Figures

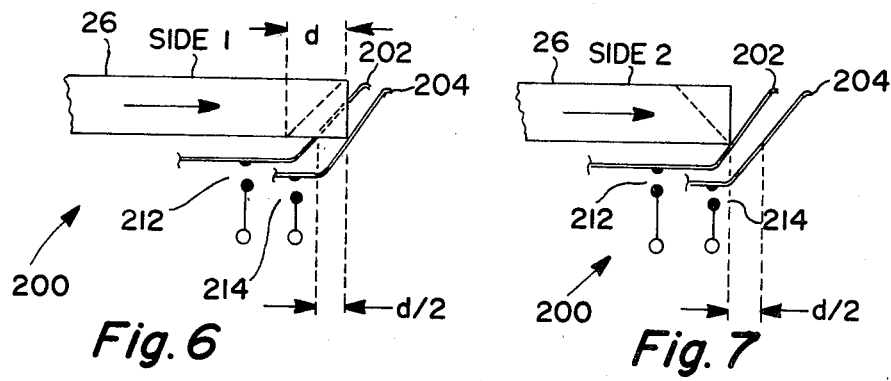
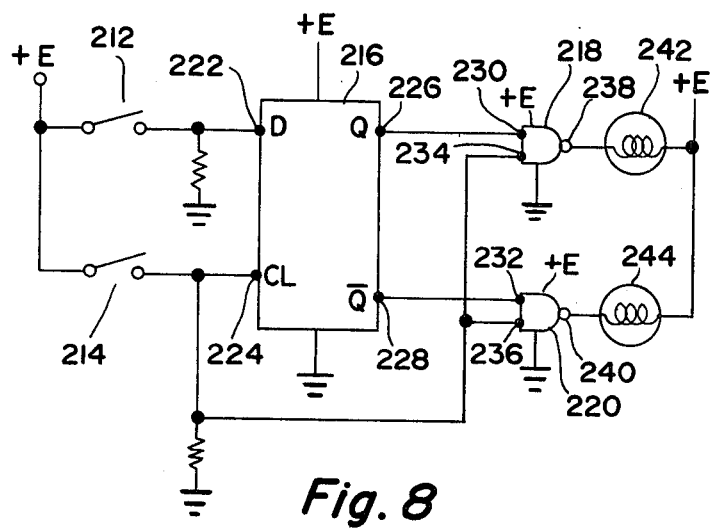
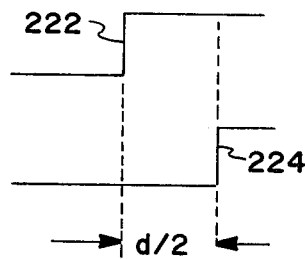 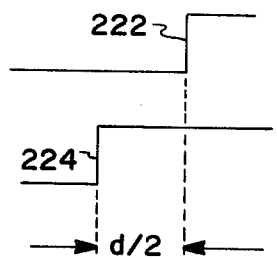

VIDEO DISC PLAYER HAVING RECORD SIDE IDENTIFYING APPARATUS

This invention generally relates to video disc players, and more particularly, it pertains to a mechanism, responsive to a disc record caddy, for providing a visual indication of the record side subject to playback.

In certain systems, picture and sound signals are stored on a disc record in the form of physical undulations in a continuous spiral track disposed on the record surface. The variations in electrical capacitance between an electrode defined by a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is encased in a protective caddy which comprises an outer jacket and a record retaining spine. The spine is provided with an opening in which a record is received, thereby forming a record/spine assembly. To load a record into a player, a full caddy is inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player to retrieve the record/spine assembly. The assembled caddy is then withdrawn from the player.

In such systems, a record is loaded into the player and retrieved therefrom, while it remains encased in its protective caddy. In the caddy-type disc record players, it is desirable to equip the player with an indication means to identify which side of a disc is subject to play.

The record side identification mechanism, according to the subject invention, includes a pair of independently operating actuating members mounted in the player, and subject to engagement with the leading edge of a record caddy during a caddy insertion. The relative location of the actuating members is such that they are operated in a given and a reverse sequence depending upon which side of the caddy is uppermost during an insertion of the caddy into the player. The player is provided with a circuit means, responsive to the sequence of operation of the actuating members, for providing an indication of the record side subject to playback. In the Drawings:

FIGS. 6 and 7 are schematic side views of the record side identification mechanism which correspond to FIGS. 4 and 5 respectively;

FIG. 8 depicts a circuit means, responsive to the order of operation of the actuating members of FIGS. 4–7, for identifying which side of a disc is uppermost of the player; and FIGS. 9 and 10 depict the waveforms applied to the circuit means of FIG. 8.

Figure 1:
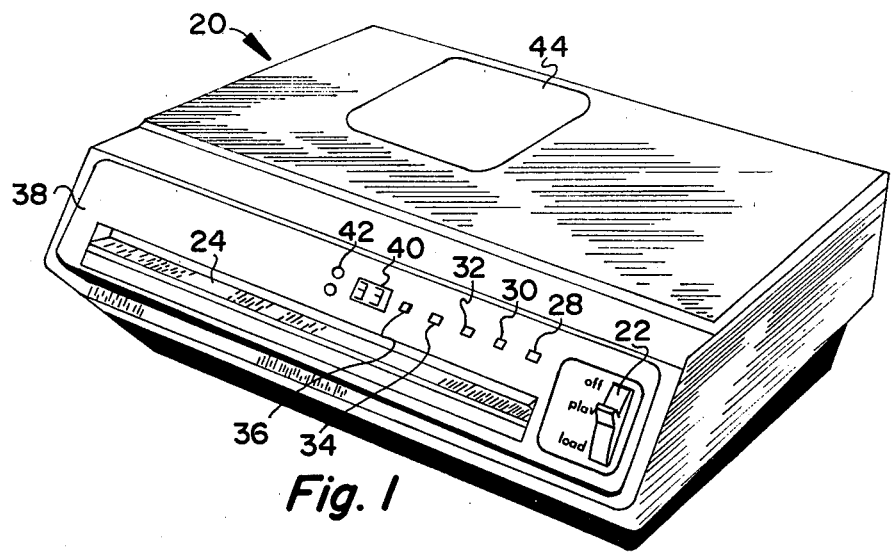
FIG. 1 is a video disc player incorporating a record side identification mechanism in accordance with the instant invention.

Shown in FIG. 1 is a video disc player 20 incorporating the present record side identification mechanism. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the prerecorded program. During rapid access, the pickup device is lifted, and rapidly moved sideways. In visual search, the pickup device is rapidly moved sideways while in engagement with the record to permit a live search. A digital LED readout 40 provides an indication of playing time and other functions, such as PAUSE, LOAD/UNLOAD and END-OF-PLAY, etc. The respective one of the SIDE 1 and 2 markings 42 on the front instrument panel 38 is lighted to provide an indication of the record side subject to play in accordance with the instant invention and in the manner described in detail herein. A removable door 44 is disposed on the cover of the player to provide access to a stylus cartridge 46, shown in FIG. 3, so that it can be replaced when required.

Figure 2:
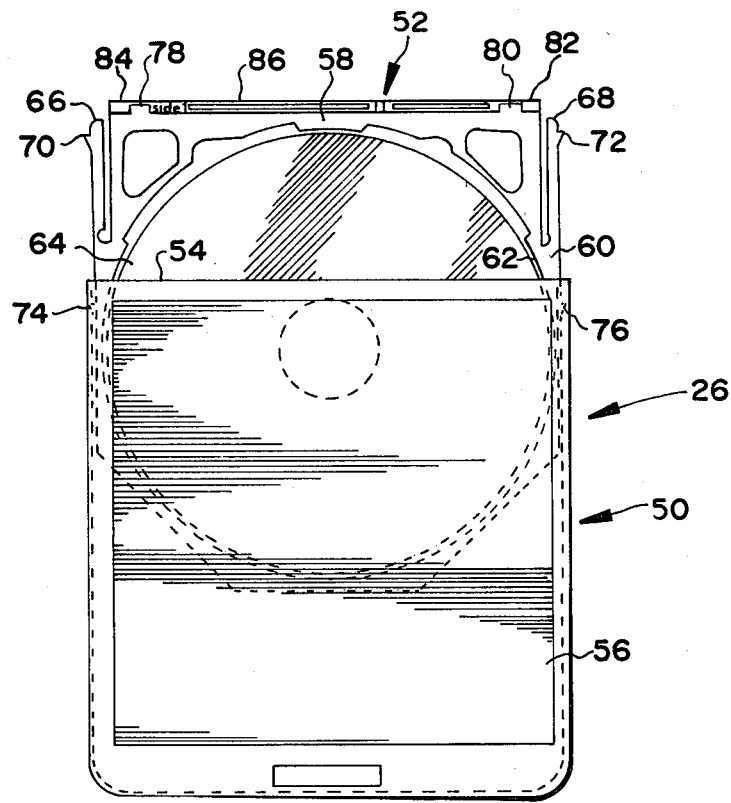
FIG. 2 shows a video disc caddy suitable for use with the record side identification mechanism in the player of FIG. 1.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a disc record 64. The spine 52 is further fitted with integrally-molded, flexural latch fingers 66 and 68. Each of the spine latch fingers 66 and 68 has a protruding element 70 and 72. The protruding elements 70 and 72 are respectively received in pockets 74 and 76 disposed in the jacket 50 for capturing the spine 52 when it is fully seated therein. The spine 52 is provided with a pair of cutouts 78 and 80 for selectively receiving a pair of player mounted gripper members to secure the spine to the player. The spine 52 is further fitted with a pair of ramps 82 and 84 extending away from its leading edge 86.

Figure 3:
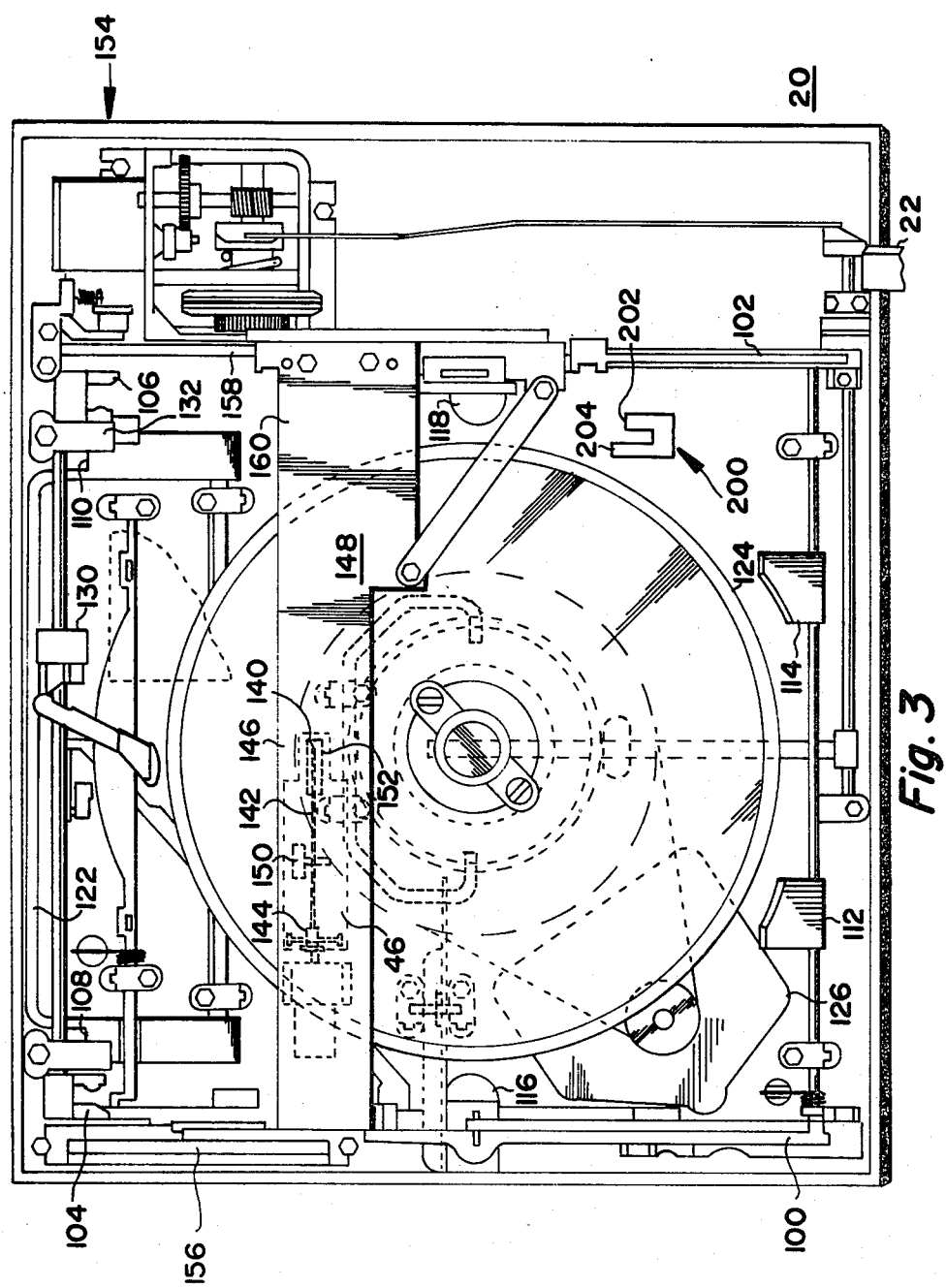
FIG. 3 represents a plan view of the player of FIG. 1 with its cover removed to reveal the underlying details.

The details of the caddy/player interface will now be explained in conjunction with FIG. 3. To insert a record, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148. A stylus arm lifter 150 is mounted in the carriage 148 to selectively lower the pickup stylus 140 through an opening 152 provided in the bottom wall of the carriage to effect record engagement. During playback, a carriage drive mechanism 154 drives the carriage 148 on guide ways 156 and 158 disposed parallel to the caddy side rails 100 and 102 from a starting position at the back of the player toward the front of the player in synchronism with the radially inward motion of the groove-guided pickup stylus 140.

During playback, the variations in electrical capacitance between an electrode carried by the stylus 140 and a conductive property of the record 64, in correspondence to the rises and falls of the disc surface under the stylus end, are sensed by pickup circuitry 160 to reproduce the stored information on the record. The recovered signals are processed by signal processing circuits 160 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is reinserted into the player through the input slot 24 along the caddy side rails 100 and 102. As the jacket 50 is driven into the player, the front edge thereof engages the carriage 148 to push it back to a preset travel limit stop defining the starting position, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The assembled caddy is then extracted from the player.

The instant record side identification mechanism 200 will now be explained in conjunction with FIGS. 3-10. The apparatus 200 includes a pair of independently operating leaf springs 202 and 204 mounted in the player, and subject to engagement with the leading edge 86 of the caddy. The lateral location of the first leaf spring 202 is such that it is disposed in the path of the ramp 82 when the caddy is inserted into the player with the SIDE 1 facing upward in the manner shown in FIGS. 4 and 6. The first leaf spring 202 is positioned closer to the front of the player by a distance equal to one half the base dimension of the ramp (i.e., d/2 in FIG. 6) than the second leaf spring 204.

Figure 4:
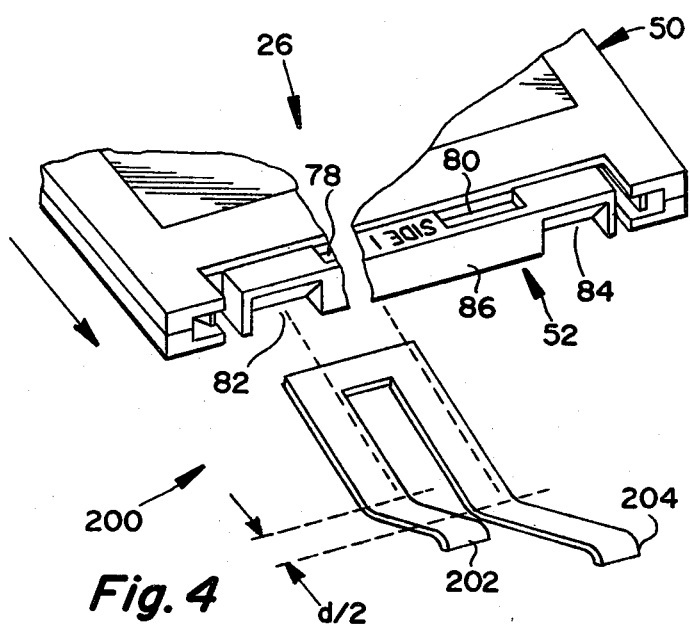
FIGS. 4 and 5 illustrate the operation of a pair of actuating members of the subject record side identification mechanism, the record caddy being inserted into the player, respectively, with its side one and side two facing up.

When the caddy is inserted into the player with the SIDE 1 facing up as shown in FIGS. 4 and 6, the leaf spring 204 is activated before the leaf spring 202. When the SIDE 2 is uppermost during a caddy insertion in the manner shown in FIGS. 5 and 7, the leaf spring 202 is operated by the caddy before the leaf spring 204. Thus the order in which the leaf springs 202 and 204 are actuated depends upon which disc side is uppermost in the player.

The record side identification apparatus 200 further includes a circuit means 210, shown in FIG. 8, responsible to the order of operation of the leaf springs 202 and 204 for indicating the record side subject to play. The circuit means 210 includes a pair of switches 212 and 214 arranged such that each one of said switches is activated (i.e., a conductive path is provided) by the engagement of a respective one of the leaf springs 202 and 204 by the leading edge 86 of the caddy 26 as shown in FIGS. 6 and 7. The common portion 203 of the apparatus 200 is fixedly secured to the player housing while the leaf springs 202 and 204 are allowed to flex such that the terminals located on the underside of the springs make contact with corresponding terminals included in the switches 212 and 214, respectively, when the springs are engaged by the leading edge 86 of the caddy 26. The sequence of closure of the switches 212 and 214 is determined by the order of operation of the leaf springs 202 and 204, which, in turn, is determined by which side of the caddy is facing upward.

The circuit means 210 further includes a D-type flip flop 216 and a pair of nand gates 218 and 220. The data input terminal 222 and the clock input terminal 224 are connected to a voltage source "E" through the switches 212 and 214 respectively. The $\overline{Q}$ output terminal 226 of the flip flop 216 is connected to the input terminal 230 of the nand gate 218. The $\overline{Q}$ output terminal of the flip flop 216 is connected to the input terminal 232 of the nand gate 220. When the flip flop 216 is set, the Q terminal 226 goes high and the $\overline{Q}$ terminal 228 goes low. The reverse voltages appear at the Q and $\overline{Q}$ terminals when the flip flop 216 is reset. The other input terminals 234 and 236 of the nand gates 218 and 220 are connected to the voltage source via the second switch 214. The output terminals 238 and 240 of the nand gates 218 and 220 are connected to the voltage source through the respective one of the lamps 242 and 244. The lamps 242 and 244 respectively light the SIDE 2 and SIDE 1 markings, indicated by the reference numeral 42 in FIG. 1, on the front instrument panel 38 of the player.

Figure 5:
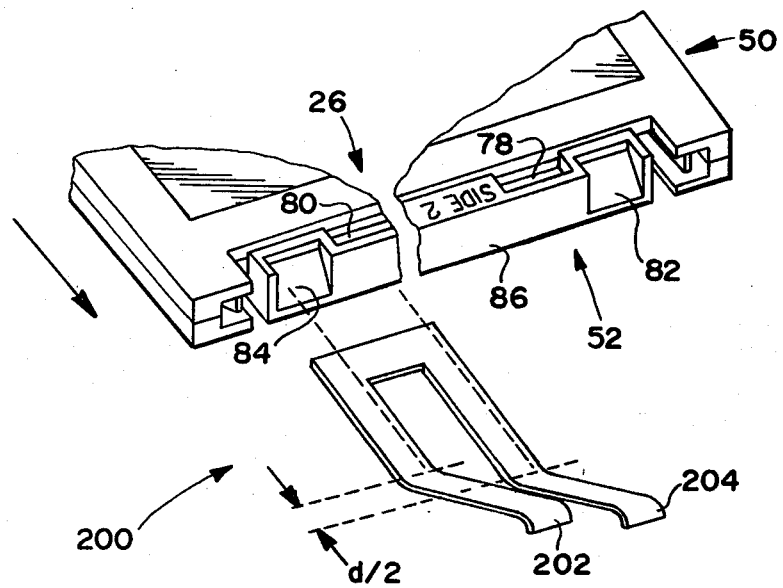

The operation of the FIG. 8 circuit is as follows. Insertion of the caddy with the SIDE 2 facing up, as shown in FIGS. 5 and 7, causes closure of the switch 212 before the switch 214. When the switch 212 is closed before the switch 214, the Q and the $\overline{Q}$ output terminals 226 and 228 of the flip flop 216 respectively go high and low when the switch 214 is closed. When the flip flop 216 is set in this fashion, the first nand gate 218 is activated, and the lamp 242, indicating the presence of the SIDE 2 of the disc on top, is lighted. FIG. 9 illustrates the voltage waveforms applied to the input terminals 222 and 224 of the flip flop 216. When the caddy is driven into the player with the SIDE 1 uppermost in the manner shown in FIGS. 4 and 6, the switch 214 is actuated before the switch 212, which causes the flip flop 216 to reset, driving the Q terminal 226 low and the $\overline{Q}$ terminal 228 high. When the flip flop 216 is reset, the second nand gate 220 is activated, and the lamp 224, indicating that the SIDE 1 of the disc is uppermost in the player, is lit. The appropriate one of the two record side indicating lights 242 and 244 remains lit as long as the record retaining spine 52 is inside the player. FIG. 10 depicts the voltage waveforms at the input terminals 222 and 224 of the flip flop 216.

The subject record side identification apparatus is not only cost effective, but it also accurately and reliably provides an indication of the record side subject to play.

What is claimed is:

1. In a player for use with a disc record enclosed in a protective caddy such that the respective sides of said record are associated with the corresponding sides of said caddy; said caddy being subject to insertion along a path into said player through an input slot to load an enclosed record therein; a record side identifying apparatus comprising:
   (A) a pair of independently-operated actuating members disposed in said player in said caddy insertion path; said actuating members being located such that they are operated respectively in a given and a reverse sequence depending upon which side of said caddy is uppermost during a caddy insertion; and
   (B) means responsive to the sequence of operation of said actuating members for providing an indication of the record side subject to play.

2. The record side identifying apparatus as defined in claim 1 wherein said record side indication providing means includes a pair of electrical switches arranged such that each one of said switches is activated by the respective one of said actuating members; the sequence of operation of said actuating members determining the order in which said switches are activated.

3. The record side identifying apparatus as defined in claim 2 wherein said indication providing means further comprises a D-type flip flop and a pair of nand gates; wherein the data input terminal and the clock input terminal of said flip flop are connected to a voltage source through respective ones of said switches; wherein the Q output terminal of said flip flop is connected to one of two input terminals of one of said nand gates; wherein the $\overline{Q}$ output terminal of said flip flop is connected to one of two input terminals of the other of said nand gates; wherein the other input terminals of said nand gates are connected to said voltage source through one of said switches.

4. The record side identifying apparatus as defined in claim 3 wherein said indication providing means further includes a pair of record side indicator devices; wherein said devices are connected between a point of reference potential and the output terminal of a respective one of said nand gates.

5. In a player for use with a disc record enclosed in a protective caddy such that the respective sides of said record are associated with the corresponding sides of said caddy; said caddy being subject to insertion along a path into said player through an input slot to load an enclosed record therein; a record side identifying apparatus comprising:
   (A) a pair of independently-operated actuating members mounted in said player in said caddy insertion path; one of said actuating members being arranged in the path of a discontinuity disposed in the leading edge of said caddy; the relative locations of said actuating members along said caddy insertion path being such that said actuating members are acted upon in a given and a reverse sequence depending upon the disposition of said one actuating member in and out of the path of said discontinuity during a caddy insertion; and
   (B) means responsive to the sequence of operation of said actuating members for providing an indication of the record side subject to play.

6. The record side identifying apparatus as defined in claim 5 for use with said protective caddy comprising a jacket and a planar record retaining spine removably located within said jacket; said record retaining spine having an opening in which a record is received to form a record/spine assembly such that the respective sides of said record are associated with the corresponding sides of said spine; said discontinuity being arranged in the leading edge of said spine; said one actuating member being disposed relatively closer to said player input slot by a distance such that said one actuating member is operated before and after the other of said actuating members when said caddy is inserted into said player such that said one actuating member is disposed respectively out of and in the path of said discontinuity in said spine.

7. The record side identifying apparatus as defined in claim 6 wherein said discontinuity in said spine is defined by an inclined surface extending away from said leading edge of said spine.

8. The record side identifying apparatus as defined in claim 7 wherein said actuating members comprise a pair of leaf springs having portions extending into said caddy insertion path.

9. In a player for use with a disc record enclosed in a protective caddy such that the respective sides of said record are associated with the corresponding sides of said caddy; said caddy being subject to insertion along a path into said player through an input slot to load an enclosed record therein; a record side identifying apparatus comprising:

(A) a pair of electrical switches;

(B) a pair of independently-operated actuating members disposed in said player in said caddy insertion path; each one of said actuating members operating the respective one of said switches; said actuating members being located such that they are operated respectively in a given and a reverse sequence depending upon which side of said caddy is uppermost during a caddy insertion; the sequence of operation of said actuating members determining the order in which said switches are closed; and (C) means responsive to the order of closure of said switches for providing an indication of the record side subject to play.

10. The record side identifying apparatus as defined in claim 9 wherein each of said switches has a pair of contact elements; one of said elements of each of said switches being disposed on the respective one of said actuating members for making a contact with the other of said switch elements upon actuation.

11. The record side identifying apparatus as defined in claim 9 for use with said protective caddy comprising a jacket and a planar record retaining spine removably located within said jacket; said record retaining spine having an opening in which a record is received to form a record/spine assembly such that the respective sides of said record are associated with the corresponding sides of said spine; the leading edge of said spine defining a discontinuity located such that one of said actuating members is disposed in the path of said discontinuity during a caddy insertion; said one actuating member being disposed relatively closer to said player input slot by a distance such that said one actuating member is operated before and after the other of said actuating members when said caddy is inserted into said player with said discontinuity in said leading edge disposed respectively out of and in the path of said one actuating member.

12. The record side identifying apparatus as defined in claim 11 wherein said discontinuity in said spine is defined by an inclined surface extending away from said leading edge of said spine.

13. The record side identifying apparatus as defined in claim 12 wherein said actuating members comprise a pair of leaf springs having portions extending into said caddy insertion path.

14. The record side identifying apparatus as defined in claim 9 wherein said indication providing means comprises a D-type flip flop and a pair of nand gates; wherein the data input terminal of said flip flop is connected to a voltage source through one of said switches; wherein the clock input terminal of said flip flop is connected to said voltage source through the other of said switches; wherein the Q output terminal of said flip flop is connected to one of two input terminals of one of said nand gates; wherein the Q output terminal of said flip flop is connected to one of two input terminals of the other of said nand gates; wherein the other input terminals of said nand gates are connected to said voltage source through said other switch.

15. The record side identifying apparatus as defined in claim 14 further including a pair of record side indicator devices; wherein one of said device is connected between a point of reference potential and the output terminal of said one of said nand gates; wherein the other of said devices is interposed between said point of reference potential and the output terminal of the other of said nand gates.

* * * * *

UNITED STATES PATENT AND TRADEMARK OFFICE
CERTIFICATE OF CORRECTION

PATENT NO. : 4,352,175
DATED : September 28, 1982
INVENTOR(S) : Horatio Nelson Crooks It is certified that error appears in the above—identified patent and that said Letters Patent is hereby corrected as shown below:

Col. 2, line 13

"of" second occurrence should be -- in --

Col. 5, line 3

"$\overline{Q}$" should be -- Q --

Col. 5, line 23

"the Q output" should be -- the $\overline{Q}$ output --

Col. 8, line 24

"Q" should be -- $\overline{Q}$ --

Signed and Sealed this

Twenty-eighth Day of December 1982

[SEAL]

Attest:

GERALD J. MOSSINGHOFF

Attesting Officer   Commissioner of Patents and Trademarks